(12) United States Patent
Burkinshaw et al.

(10) Patent No.: US 10,125,818 B2
(45) Date of Patent: Nov. 13, 2018

(54) TURBOMACHINE SHAFT AND JOURNAL BEARING ASSEMBLY

(71) Applicant: Cummins Ltd, Huddersfield (GB)

(72) Inventors: Michael Burkinshaw, West Yorkshire (GB); Craig Lancaster, Yorkshire (GB); Jason Maxim Hall, North Yorkshire (GB)

(73) Assignee: CUMMINS LTD., Huddersfield (GB)

( * ) Notice: Subject to any disclaimer, the term of this patent is extended or adjusted under 35 U.S.C. 154(b) by 0 days.

(21) Appl. No.: 15/535,401

(22) PCT Filed: Dec. 18, 2015

(86) PCT No.: PCT/GB2015/054089
§ 371 (c)(1),
(2) Date: Jun. 12, 2017

(87) PCT Pub. No.: WO2016/097766
PCT Pub. Date: Jun. 23, 2016

(65) Prior Publication Data
US 2017/0370409 A1    Dec. 28, 2017

(30) Foreign Application Priority Data

Dec. 19, 2014  (GB) .................................. 1422701.1

(51) Int. Cl.
*F16C 17/18*    (2006.01)
*F16C 33/12*    (2006.01)
(Continued)

(52) U.S. Cl.
CPC ............ *F16C 33/121* (2013.01); *C22C 12/00* (2013.01); *F16C 17/18* (2013.01); *F16C 3/02* (2013.01);
(Continued)

(58) Field of Classification Search
CPC .. F16C 3/02; F16C 17/02; F16C 35/02; F16C 33/121; F16C 2204/12; F16C 2204/18; C22C 9/02
(Continued)

(56) References Cited

U.S. PATENT DOCUMENTS 2,131,062 A  *  9/1938  McBride ................ B22D 19/00
                                                                    164/348
2,719,390 A  *  10/1955  Jones ........................ B24B 7/24
                                                                    428/932

(Continued)

FOREIGN PATENT DOCUMENTS

EP       0812996 A2  *  12/1997  ........... F01D 25/168
GB         596626 A  *   1/1948  ................ B22F 7/04
(Continued)

OTHER PUBLICATIONS

Examination report issued by the United Kingdom Intellectual Property Office, dated Jun. 22, 2015, for related Application No. GB1422701.1; 6 pages.
(Continued)

*Primary Examiner* — Marcus Charles
(74) *Attorney, Agent, or Firm* — Faegre Baker Daniels LLP

(57) ABSTRACT

A turbomachine comprising a turbomachine shaft for rotation about an axis and for supporting a turbine wheel at one end of the turbomachine shaft; and a bearing housing having a wall defining a bore in which the turbomachine shaft is received with a substantially annular clearance, the turbomachine shaft being supported for rotation in the bore by at least one journal bearing located within the annular clearance. A surface of the turbomachine shaft which radially underlies the or each journal bearing has a surface roughness (Ra) of less than 0.15 microns and the or each
(Continued)

journal bearing comprises a bronze alloy incorporating bismuth in an amount of up to around 6 wt %.

11 Claims, 6 Drawing Sheets

(51) Int. Cl.
    *F16C 3/02*     (2006.01)
    *F16C 17/02*     (2006.01)
    *C22C 12/00*     (2006.01)
(52) U.S. Cl.
    CPC .......... *F16C 17/02* (2013.01); *F16C 2240/54* (2013.01); *F16C 2360/24* (2013.01)
(58) Field of Classification Search
    USPC .......... 384/95, 114, 125, 129, 275–276, 282, 384/263, 416; 148/433; 420/420, 499, 420/587; 415/104
    See application file for complete search history.

(56) References Cited

U.S. PATENT DOCUMENTS

| | | | | |
|---|---|---|---|---|
| 3,322,547 | A * | 5/1967 | Quaas | C22C 9/00 420/472 |
| 3,730,705 | A * | 5/1973 | Latrobe | C22C 9/02 420/473 |
| 4,551,395 | A * | 11/1985 | Lloyd | B22F 7/04 384/912 |
| 4,735,655 | A * | 4/1988 | Weis | B24D 3/06 75/231 |
| 2003/0128903 | A1 | 7/2003 | Yasuda et al. | |
| 2004/0136860 | A1 | 7/2004 | Fujita et al. | |
| 2005/0089392 | A1 * | 4/2005 | Lubell | F01D 25/16 415/104 |
| 2005/0288171 | A1 | 12/2005 | Ujita et al. | |
| 2006/0000527 | A1 * | 1/2006 | Yokota | C22C 32/00 148/432 |
| 2010/0111753 | A1 * | 5/2010 | Yoshitome | C22C 1/0425 420/470 |
| 2011/0020171 | A1 * | 1/2011 | Wada | B22F 1/0003 420/470 |
| 2011/0027612 | A1 * | 2/2011 | Funaki | C22C 9/02 428/676 |
| 2012/0306206 | A1 * | 12/2012 | Agrawal | F04D 25/024 290/52 |
| 2014/0147326 | A1 | 5/2014 | Wada et al. | |

FOREIGN PATENT DOCUMENTS

| | | | |
|---|---|---|---|
| GB | 2394230 A | 4/2004 | |
| GB | 2495407 A | 4/2013 | |
| JP | H11351242 A | 12/1999 | |
| JP | 2009097641 A | 5/2009 | |
| JP | 2012219866 A | 11/2012 | |
| WO | WO-2005080620 A1 * | 9/2005 | ............ B22F 1/0014 |
| WO | WO2009084072 A1 | 7/2009 | |

OTHER PUBLICATIONS

International Search Report and Written Opinion issued by the European Patent Office, dated Mar. 15, 2016, for International Application No. PCT/GB2015/054089; 11 pages.

Lagermetall: Federalloys III—C 893 25, Apr. 18, 2013, available on the Internet as of Jun. 1, 2017 archive.is http://www.largermetall.se/brons/89325.asp, 1 page.

* cited by examiner

TURBOMACHINE SHAFT AND JOURNAL BEARING ASSEMBLY

RELATED APPLICATIONS

The present application is a national phase filing under 35 U.S.C. § 371 of International Application No. PCT/GB2015/054089, titled "A TURBOMACHINE SHAFT AND JOURNAL BEARING ASSEMBLY," filed on Dec. 18, 2015, which claims the benefit of priority to British Patent Application No. 1422701.1, filed with the United Kingdom Intellectual Property Office on Dec. 19, 2014, the entire disclosures of which being expressly incorporated herein by reference.

FIELD OF THE DISCLOSURE

The present disclosure relates to a shaft and journal bearing assembly of a turbomachine.

BACKGROUND

A conventional turbomachine essentially comprises an exhaust gas driven turbine wheel mounted on a rotatable shaft within a turbine housing connected downstream of an engine outlet manifold. In a turbocharger, rotation of the turbine wheel drives a compressor wheel mounted on the other end of the shaft within a compressor housing to deliver compressed air to the engine intake manifold. In a power turbine, rotation of the turbine wheel drives a gear which transmits mechanical power to the engine flywheel or crankshaft. The turbomachine shaft is conventionally supported by a bearing assembly made up of journal and thrust bearings, including appropriate lubricating systems, located within a bearing housing.

The journal bearings support the turbomachine shaft for rotation and typically consist of a pair of fully floating bearings, each in the form of an annular bush mounted on to the shaft. One journal bearing is usually located at each end of the section of the shaft received in the bearing housing and is retained in place axially relative to the shaft by a pair of circlips or the like, one circlip provided to each side of the bearing.

Axial forces imparted to the turbomachine shaft during operation are resisted by an axial thrust bearing that is typically in the form of a thin disc disposed around the shaft and supported on one side by a thrust collar and on the other by the bearing housing and/or other components. The thrust bearing has a central bore for receiving the thrust collar that is mounted on the shaft for rotation therewith immediately adjacent a radial step defined thereon. The thrust bearing is supported between a retaining circlip and the bearing housing. Axial forces towards the turbine wheel are transmitted to the thrust bearing by the thrust collar and in the opposing direction by either an oil slinger mounted on the turbomachine shaft in a turbocharger or a thrust ring mounted on the turbomachine shaft in a power turbine.

The turbomachine shaft and bearing assembly rotate at very high speeds and effective lubrication is imperative to avoid premature failure through wear or seizure. Lubricating oil is supplied to the bearing assembly from the engine oil system via an oil inlet in the bearing housing. Oil is distributed via galleries and passages in the bearing housing to circumferential holes in the outer races of journal bearings. When the engine is in operation the oil is supplied under pressure to the rotating bearing assemblies and the oil penetrates through the circumferential holes to an interface between the inner part of the bearings and the shaft. Similarly, the oil is supplied from the galleries and passages to the periphery of the thrust bearing from where it penetrates through a radially extending passage in the disc to the interface between it and the thrust collar. The oil drains from the bearing assembly bore between the thrust bearing and thrust collar and either the oil slinger in a turbocharger or the thrust ring in a power turbine, and at the end of the bearing housing bore adjacent to the turbine housing.

Typically, turbomachine journal bearings have been manufactured from a leaded bronze in view of the excellent suitability of this class of alloys to the harsh working environment found in turbomachines. An exemplary leaded bronze suitable for use in a turbocharger journal bearing has the following chemical composition: Sn 5-7 wt %; Pb 14-18 wt %; Ni 0.75 wt % max; Fe 0.4 wt % max; P 0.05 wt % max; Zn 1.5 wt % max; and Cu balance. More recently, increasingly stringent industry regulations have resulted in the need to find alternative materials that contain less or, preferably, no lead in view of its toxicity and the potential harm that it can cause to the environment if released during manufacture, use or subsequent disposal of components incorporating it. This presents numerous challenges, however, in view of the excellent chemical and physical properties that result from the inclusion of lead in turbomachine journal bearings.

SUMMARY

It is an object of the present disclosure to obviate or mitigate one or more of the aforementioned challenges.

It is a further object of the present disclosure to develop an improved journal bearing for a turbomachine which incorporates less lead than conventional leaded bronze journal bearings but that still functions satisfactorily.

According to a first aspect of the present disclosure there is provided a turbomachine comprising: a turbomachine shaft for rotation about an axis and for supporting a turbine wheel at one end of the turbomachine shaft; and a bearing housing defining a bore in which the turbomachine shaft is received with a substantially annular clearance, the turbomachine shaft being supported for rotation in the bore by at least one journal bearing located within the annular clearance; wherein a surface of the turbomachine shaft which radially underlies the or each journal bearing has a surface roughness (Ra) of less than 0.15 microns and the or each journal bearing comprises a bronze alloy incorporating bismuth in an amount of up to around 6 wt %.

It has surprisingly been found that a particular combination of microfinished shaft and bismuth bronze journal bearing affords a system that can be used in place of current shaft/journal bearing combinations that rely upon the use of journal bearings manufactured from a leaded bronze. By investigating not only the properties of the journal bearing, but the bearing in combination with the surface finish of the shaft upon which the journal bearing is to be mounted, the devisors of the present disclosure have been able to overcome many of the challenges faced when seeking to reduce the lead content in current journal bearings.

A second aspect of the present disclosure provides a shaft and journal bearing assembly comprising: a shaft for rotation about an axis; and at least one journal bearing to be mounted on the shaft; wherein a surface of the shaft which will radially underlie the or each journal bearing when mounted on the shaft has a surface roughness (Ra) of less than 0.15 microns and the or each journal bearing comprises a bronze alloy incorporating bismuth in an amount of up to around 6 wt %.

It will be appreciated that the shaft and journal bearing assembly of the second aspect of the present disclosure is eminently suitable for use in a turbomachine, such as a fixed or variable geometry turbocharger or power turbine.

While there are many different parameters used to characterise the surface finish of a component, in the present context the average surface roughness (Ra) will be used consistently hereinafter in view of its widespread use in the relevant technical field. 'Ra' is defined as the arithmetic mean of the absolute values of the deviation of the surface profile (i.e. peaks and valleys) from a mean line defined by the surface. In the technical literature the 'Ra' definition of surface finish is also sometimes referred to as the 'center line average' (CLA) or the 'area average' (AA).

In the present context, reference to 'bronze' or a 'bronze alloy' relates to a metallic composition incorporating predominantly copper and at least one further element, such as, for example, tin, arsenic, aluminium, manganese and/or zinc.

The surface of the turbomachine shaft which radially underlies the or each journal bearing may have a surface roughness (Ra) of at least around 0.02 microns. The surface of the turbomachine shaft which radially underlies the or each journal bearing may have a surface roughness (Ra) of around 0.04 to 0.10 microns, around 0.06 to 0.08 microns, or around 0.07 microns.

The bronze alloy may incorporate bismuth in an amount of up to around 4 wt %. The bronze alloy may incorporate at least around 1 wt % bismuth. The bronze alloy may incorporate around 1.5 to 4.0 wt % bismuth, around 2.0 to 3.9 wt % bismuth, around 2.5 to 3.8 wt % bismuth, around 2.7 to 3.7 wt % bismuth, or around 3.2 wt % bismuth. Alternatively, the bronze alloy may incorporate around 4 to 6 wt % bismuth.

The or each journal bearing is preferably manufactured from a bismuth bronze alloy incorporating up to around 6 wt % bismuth or up to around 4 wt % bismuth. It is preferred that the or each journal bearing consists or consists essentially of a bronze alloy incorporating bismuth, and that the bronze alloy incorporates no more than around 6 wt % bismuth or no more than around 4 wt % bismuth. As stated above, all references to a 'bronze alloy' herein are intended to refer to an alloy whose predominant component is copper. The bronze alloy preferably incorporates at least around 80 wt % copper. The bronze alloy may incorporate around 82 to 94 wt % copper, or around 84 to 92 wt % copper, or around 84 to 88 wt % copper. While the bronze alloy of the present disclosure may incorporate one or more additional elements, it is preferred that the main additional element is tin. That is, it is preferred that the component of the bronze alloy present in the bronze alloy in the greatest amount in wt %, after copper, is tin. The bronze alloy may incorporate at least around 5 wt % tin, around 7 to 13 wt % tin, or around 9 to 11 wt % tin. An insufficiently even distribution of bismuth in the journal bearing may lead to undesirable linear defects propagating within the microstructure of the bearing, resulting in less than optimum performance of the bearing. It is therefore preferable to manufacture the or each journal bearing from a composition which, at least initially, contains a suitable amount of Misch metal to aid the even distribution of bismuth within the microstructure of the bearing. Any Misch metal present in the initial bismuth bronze composition may be lost during the bearing manufacturing process, casting being a preferable way of manufacturing such journal bearings.

The chemical composition of two preferred bismuth bronze alloys (Alloy 1 and Alloy 2) suitable for use in the manufacture of journal bearings in accordance with the present disclosure is set out below in Table 1. A commercially available alloy having a chemical composition in line with that of Alloy 1 is Magnolia B1™. A commercially available alloy having a chemical composition in line with that of Alloy 2 is Federalloy™.

TABLE 1

| Element | Alloy 1 | Alloy 2 |
| --- | --- | --- |
| Sn | 5-7 | 9-11 |
| Pb | 0.09 max | 0.09 max |
| Ni | 1 max | — |
| Ni + Co | — | 0.2-1 max |
| Fe | 0.2 max | 0.15 max |
| P | 0.1-0.5 max | 0.02-0.1 max |
| Zn | 1 max | 1 max |
| Bi | 4-6 | 2.7-3.7 |
| Sb | 0.35 | 0.5 |
| S | 0.08 | 0.08 |
| Al | 0.005 | 0.005 |
| Si | 0.005 | 0.005 |
| Cu | 87-91 | 87-91 |
| Misch metal* | — | 0.1-2 |

Notes: (i) Amounts specified in wt. %; and (ii) * Misch metal elements disappear during the casting process so are not always present in final product.

Other advantageous and preferred features of the disclosure will be apparent from the following description.

BRIEF DESCRIPTION OF THE DRAWINGS

Specific embodiments of the present disclosure will now be described, by way of example only, with reference to the accompanying drawings, in which.

DETAILED DESCRIPTION OF THE DRAWINGS

Figure 1:
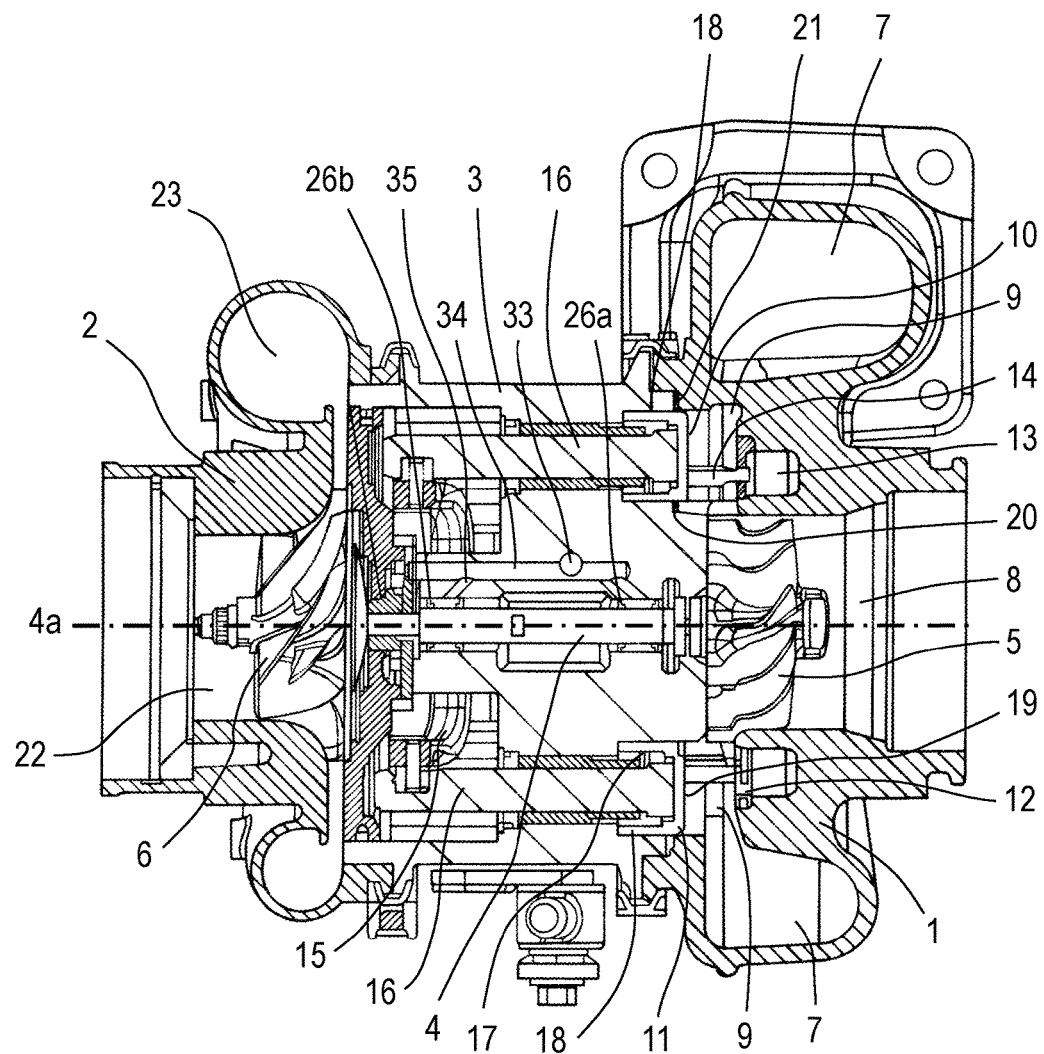
FIG. 1 is an axial cross-section through a variable geometry turbomachine incorporating a shaft and journal bearing assembly in accordance with an embodiment of the present disclosure.

Referring to FIG. 1, this illustrates a known variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is welded on one end of the shaft 4 for rotation within the turbine housing 1, and a compressor wheel 6 is mounted on the other end of the shaft 4 for rotation within the compressor housing 2. The shaft 4 rotates about a turbocharger axis 4a on bearing assemblies located in the bearing housing 3 which will be described in more detail below with reference to FIG. 2.

The turbine housing 1 defines an inlet volute 7 to which gas from an internal combustion engine (not shown) is delivered. The exhaust gas flows from the inlet volute 7 to an axial outlet passageway 8 via an annular inlet passageway 9 and the turbine wheel 5. The inlet passageway 9 is defined on one side by a face 10 of a radial wall of a movable annular wall member 11, commonly referred to as a "nozzle ring", and on the opposite side by an annular shroud 12 which forms the wall of the inlet passageway 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the nozzle ring 11 is proximate to the annular shroud 12, the vanes 14 project through suitably configured slots in the shroud 12, into the recess 13.

The position of the nozzle ring 11 is controlled by an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending actuating rods 16 that support the nozzle ring 11. Accordingly, by appropriate control of the actuator (which may for instance be pneumatic or electric), the axial position of the rods 16 and thus of the nozzle ring 11 can be controlled.

The speed of the turbine wheel 5 is dependent upon the velocity of the gas passing through the annular inlet passageway 9. For a fixed rate of mass of gas flowing into the inlet passageway 9, the gas velocity is a function of the width of the inlet passageway 9, the width being adjustable by controlling the axial position of the nozzle ring 11. FIG. 1 shows the annular inlet passageway 9 fully open. The inlet passageway 9 may be closed to a minimum by moving the face 10 of the nozzle ring 11 towards the shroud 12.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet volute 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

Figure 2:
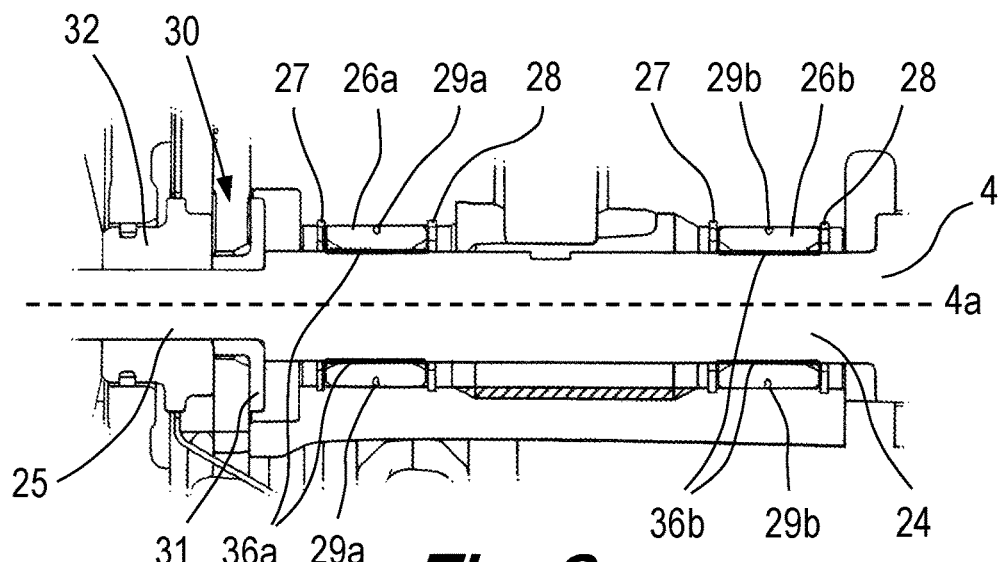
FIG. 2 is an axial sectioned schematic view of part of a bearing housing of a turbocharger, showing the shaft and journal bearing assembly in accordance with an embodiment of the present disclosure.

Referring to the shaft and journal bearing arrangement shown in FIG. 2 using the same reference numerals for like parts as in FIG. 1 for clarity, the turbocharger shaft 4 rotates about axis 4a and is stepped to form two portions: a first portion 24 of a first diameter that supports the turbine wheel 5 (not shown in FIG. 2); and a second portion 25 of a second diameter, less than the first diameter, that supports the compressor wheel 6 (not shown in FIG. 2). The first portion 24 of the shaft 4 supports two journal bearings 26a, 26b. Each journal bearing 26a, 26b is in the form of an annular bush manufactured from a bismuth bronze alloy having the composition set out below in Table 1. Each journal bearing 26a, 26b is retained in place by a pair of circlips 27, 28 and defines a plurality of circumferentially spaced holes 29a, 29b that extend radially through the radial thickness of the journal bearing 26a, 26b to define a path for oil to flow through the journal bearing 26a, 26b to the turbocharger shaft 4. The oil then drains out of the journal bearings 26a, 26b through the holes 29a, 29b and returns to the engine sump. The second portion 25 of the shaft 4 supports a thrust bearing assembly 30, incorporating a thrust collar 31, and an oil slinger 32 of conventional configuration. The thrust bearing assembly 30 and oil slinger 32 will not be further described since they are not relevant to the present disclosure. Lubricating oil is fed to the journal bearings 26a, 26b and thrust bearing assembly 30 under pressure from the oil system of the engine. As shown in FIG. 1, the oil is fed to the journal bearings 26a, 26b and thrust bearing assembly 30 via an oil inlet 33, gallery 34 and passages 35 (only one is labelled in FIG. 1).

The surfaces of the two sections of the turbocharger shaft 4 that radially underlie the journal bearings 26a, 26b extend axially between the circlips 27, 28 and extend circumferentially around the full circumference of the turbocharger shaft 4. For the sake of clarity, by way of illustration only, these surfaces are denoted by the thick black lines in FIG. 2 and are labelled as 36a, 36b. Surfaces 36a, 36b of the turbocharger shaft 4 have been subjected to a microfinishing process using an abrasive tape as set out below in the Examples so as to exhibit a target surface roughness (Ra) in the range 0.06 to 0.08 microns.

EXAMPLES

Journal Bearing

The journal bearings were manufactured from continuous cast bar having the chemical composition set out in Table 2 below.

TABLE 2

| Element | Minimum Wt. % | Maximum Wt. % |
| --- | --- | --- |
| Aluminium | | 0.005 |
| Antimony | | 0.50 |
| Bismuth | 2.70 | 3.70 |
| Copper (a) | 84.0 | 88.0 |
| Iron | | 0.15 |
| Lead | | 0.09 |
| Misch Metal (b) | 0.10 | 2.00 |
| Nickel & Cobalt | 0.20 | 1.00 |
| Phosphorous | 0.02 | 0.10 |
| Silicon | | 0.005 |
| Sulphur | | 0.08 |
| Tin | 9.00 | 11.00 |
| Zinc | | 1.00 |

Notes: (a) Copper+sum of named elements (including Misch metal)=99.0% min. (b) It is recognised that Misch metal elements may reduce or disappear during the casting process, so may not be present in the final product. The referee method for chemical analysis shall be Inductively Coupled Plasma (ICP).

It is preferable to have Misch metal present in the initial composition from which the bearing is to be manufactured to aid the even distribution of bismuth within the microstructure of the finished component, since uneven distribution of bismuth has been observed to lead to undesirable linear defects propagating within the microstructure of the finished component.

The mechanical properties of an exemplary continuously cast and straightened bar were tested and were as set out below in Table 3.

TABLE 3

| Property | Minimum | Maximum |
| --- | --- | --- |
| Tensile Strength, MPa | 207 | |
| Yield Strength, MPa | 83 | |
| Elongation, % | 4 | |
| Core Hardness, HV 5 kilo load (see FIG. 2) | 85 | 115 |

Figure 3:
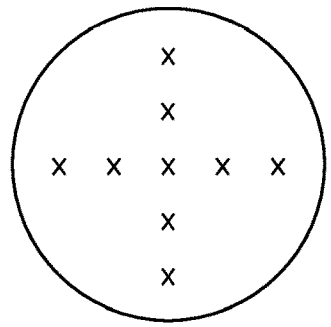
FIG. 3 is an axial cross-section through a bar product to be used in the manufacture of journal bearings forming part of the present disclosure.

Note:
The nine locations for the hardness tests on the bar product are denoted 'X' in FIG. 3.

The mechanical properties of an exemplary finished product were tested and were as set out below in Table 4.

TABLE 4

| Property | Minimum | Maximum |
| --- | --- | --- |
| OD Hardness, HV 5 kilo load | 100 | 200 |
| ID Hardness, HV 5 kilo load | 100 | 150 |
| End Face Hardness, HV 5 kilo load | 100 | 190 |
| Core Hardness, HV 5 kilo load | 85 | 150 |

Note:
Core hardness values were different due to work hardening effects from the surface machining.

The bismuth bronze journal bearing material was tested to ensure it complied with the quality requirements of ASTM B505 (Standard Specification for Copper Alloy Continuous Castings) and to ensure that the bar material was free of inclusions, porosity and defects detrimental to machinability and function.

Turbomachine Shaft

To ensure the robustness of the new journal bearing system employing the new bismuth bronze journal bearings including minimal lead, it was appreciated, for the first time, that a surface finish requirement for the steel alloy shaft better than an accepted current industry standard (surface roughness (Ra) of around 0.3 microns) would be required. As a result, tests were undertaken to investigate lower surface roughness (Ra) values and to establish a suitable microfinishing protocol.

An exemplary steel alloy shaft had the chemical composition shown below in Table 5.

TABLE 5

| Element | Minimum Wt. % | Maximum Wt. % |
| --- | --- | --- |
| Carbon | 0.38 | 0.43 |
| Silicon | 0.10 | 0.35 |
| Manganese | 0.70 | 1.00 |
| Phosphorus | | 0.025 |
| Sulphur | | 0.040 |
| Nickel | 0.40 | 0.70 |
| Chromium | 0.40 | 0.60 |
| Molybdenum | 0.20 | 0.30 |

Note:
Balance iron and incidental impurities.

Exemplary test pieces of the steel alloy to be used for a shaft taken from components complied with British Standard BS970 and exhibited the properties listed below in Table 6.

TABLE 6

| Test | Result |
| --- | --- |
| Limiting ruling section | 38 mm |
| Tensile Strength | 850/1000 MPa (55/65 tsi) |
| Yield Stress (0.2%) | 680 Mpa min (44 tsi) |
| Elongation | 12% min |
| Hardness (throughout section) | 250/300 HV |
| | 25/30 HRC |

Figure 4:
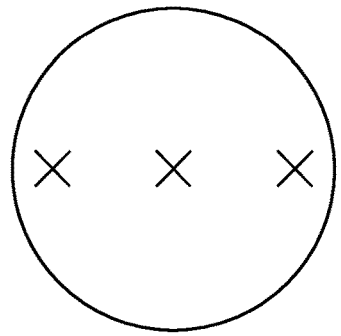
FIG. 4 is an axial cross-section through turbocharger shaft pieces to be used in testing materials for use in the manufacture of a turbocharger shaft forming part of the present disclosure.

Note: The three locations for the hardness tests on the test pieces are denoted 'X' in FIG. 4. The two outer locations were at least 2 mm in from the edge of the component.

While various microfinishing processes are available in the art, such as roller burnishing, diamond turning and chemical surface treatments (e.g. with titanium nitride), it was determined that the preferred method is to use an oscillating abrasive tape pressed against the rotating shaft journal. Exemplary tape details and operating parameters are set out below in Table 7.

TABLE 7

| Parameter | Value |
| --- | --- |
| Tape grit size | 9 µm to 15 µm |
| Tape thickness | 0.2 mm |
| Tape feed rate | 5 mm/min to 6 mm/min |
| Tape oscillation rate | 500 strokes/min |
| Shaft (work piece) rotational speed | 850 revs/min |
| Super finish fork pressure | 1.0 bar (14.5 psi) to 1.7 bar (25 psi) |
| Super finish fork dwell time | 8 sec to 10 sec |

Exemplary abrasive tape details and specifications are as follows:
  Wendt: FRAF 5000-60-15u WF1001 RS-3PL4S ASO.
  Fuji Star: DAF 4MIL 15 um D5548.
Performance Testing A series of comparative tests was carried out to investigate the wear of turbocharger shafts and different journal bearings to determine the performance of journal bearing and turbocharger shaft pairings according to the present disclosure.

The same design of turbocharger, run under the same operating conditions, was used throughout the series of tests. After use, the shaft and bearings were dissembled from the turbocharger and visually inspected for any signs of wear between the shaft and the journal bearings at each end of the shaft, i.e. at the turbine end and at the compressor end. The scoring system shown below in Table 8 was used to categorise the level of wear observed on the outer surface of the shaft, on the inner surface of the bearing and on the outer surface of the bearing:

TABLE 8

| Score (out of 10) | Degree of Wear |
| --- | --- |
| 10 | Catastrophic - seizure or turbocharger failure imminent or observed |
| 9 | Severe - adhesive wear over entire bearing land length |
| 5 | Intermediate - adhesive wear over less than the entire bearing landing length; *significant abrasive wear |

TABLE 8-continued

| Score (out of 10) | Degree of Wear |
|---|---|
| 1 | Mild - abrasive wear with polishing and/or surface scoring |
| 0 | None - no wear |

(*observation for outer surface of bearing to qualify as 'Intermediate')

Figure 5A:
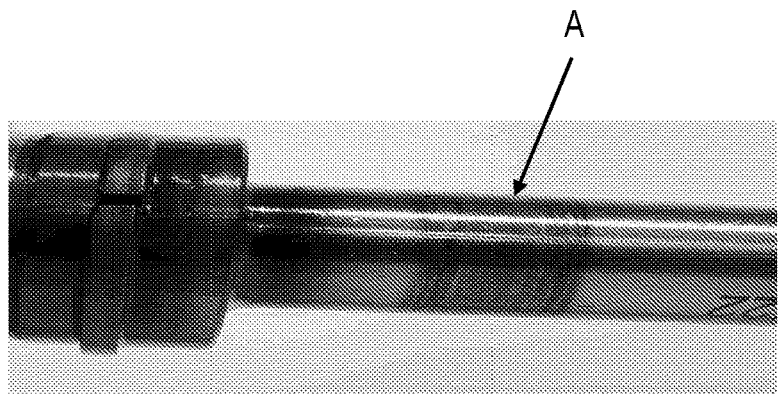
Figure 5B:
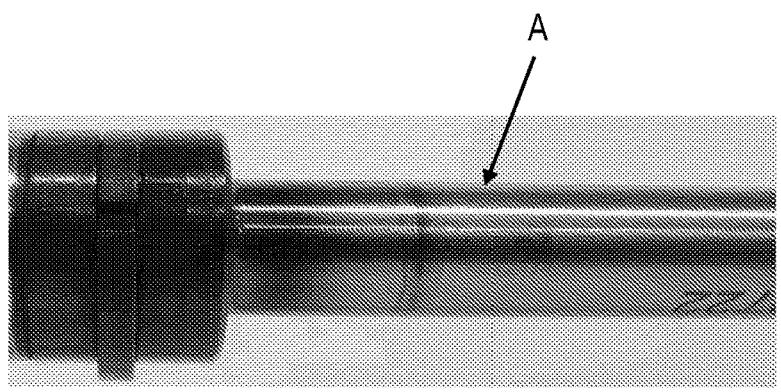
Figure 5C:
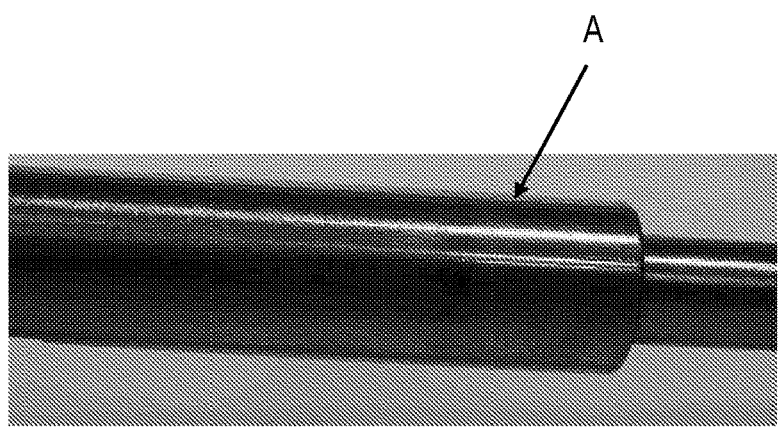

FIGS. 5A to 5C are photographs of exemplary shafts after testing. The level of wear on a region A of each shaft that radially underlies a journal bearing (not shown) during testing was observed and allocated a score from 0 to 10 according to the scoring system in Table 8. In the examples shown, the shaft in FIG. 5A was given a score of 9, the shaft in FIG. 5B was given a score of 5 and the shaft in FIG. 5C was given a score of 1.

Figure 6A:
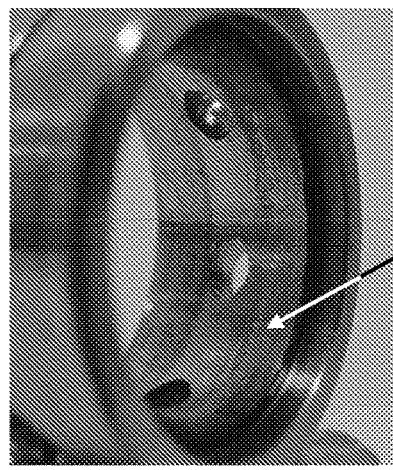
Figure 6B:
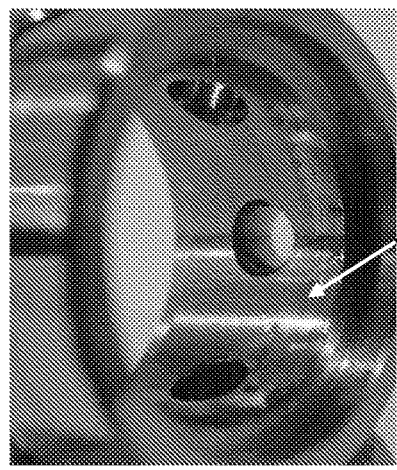
Figure 6C:
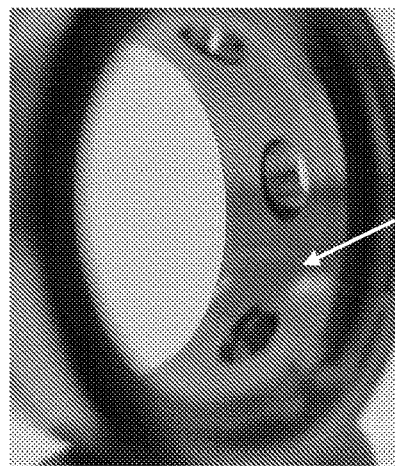

FIGS. 6A to 6C are photographs of exemplary journal bearings after testing. The level of wear on an inner surface (marked 'B') of each bearing that radially overlies a shaft (not shown) during testing was observed and allocated a score from 0 to 10 according to the scoring system in Table 8. In the examples shown, the bearing in FIG. 6A was given a score of 9, the bearing in FIG. 6B was given a score of 5 and the bearing in FIG. 6C was given a score of 1.

Figure 7A:
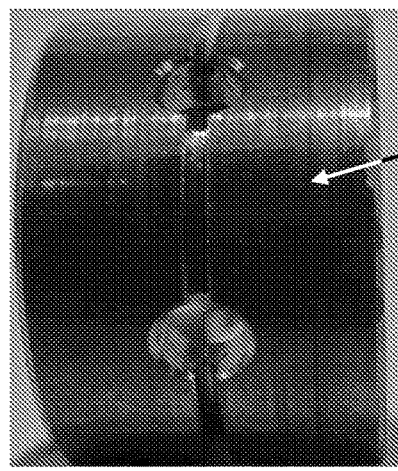
Figure 7B:
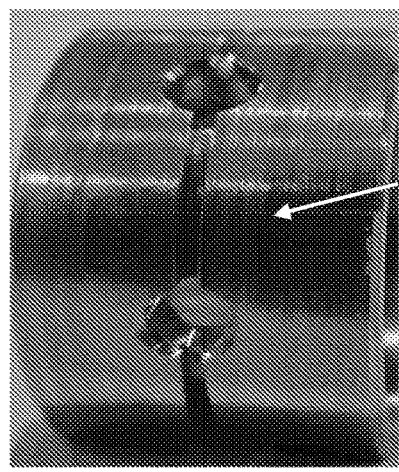
Figure 7C:
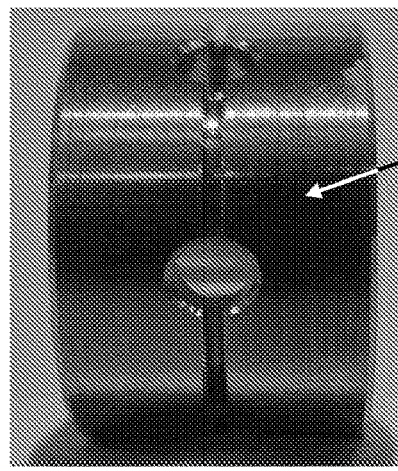

FIGS. 7A to 7C are further photographs of exemplary journal bearings after testing. The level of wear on an outer surface (marked 'C') of each bearing was observed and allocated a score from 0 to 10 according to the scoring system in Table 8. In the examples shown, the bearing in FIG. 7A was given a score of 9, the bearing in FIG. 7B was given a score of 5 and the bearing in FIG. 7C was given a score of 1.

The scoring system was used to compare the performance of a commercially available leaded-bronze journal bearing with a shaft having an Ra of 0.3 microns (Test IDs 1 to 6) to two journal bearing/shaft pairs according to the present disclosure (Test IDs 7 to 12 and 13 to 18 respectively). The scores are presented below in Table 9.

TABLE 9

| Test ID | Shaft Comp | Shaft Turb | Brg Comp OD | Brg Comp ID | Brg Turb OD | Brg Turb ID | Test Outcome | Totals |
|---|---|---|---|---|---|---|---|---|
| 1 | 0 | 5 | 1 | 1 | 1 | 1 | Fail | 9 |
| 2 | 0 | 0 | 0 | 1 | 0 | 1 | Pass | 2 |
| 3 | 9 | 9 | 1 | 5 | 5 | 5 | Fail | 34 |
| 4 | 1 | 9 | 1 | 1 | 5 | 5 | Fail | 22 |
| 5 | 1 | 0 | 1 | 1 | 1 | 1 | Pass | 5 |
| 6 | 0 | 0 | 0 | 1 | 1 | 1 | Pass | 3 |
| Totals | 11 | 23 | 4 | 10 | 13 | 14 | | 75 |
| 7 | 0 | 0 | 0 | 1 | 1 | 1 | Pass | 3 |
| 8 | 9 | 9 | 5 | 5 | 5 | 5 | Fail | 38 |
| 9 | 0 | 0 | 0 | 1 | 1 | 1 | Pass | 3 |
| 10 | 0 | 0 | 1 | 1 | 1 | 1 | Pass | 4 |
| 11 | 0 | 0 | 0 | 1 | 0 | 0 | Pass | 1 |
| 12 | 0 | 0 | 1 | 1 | 1 | 0 | Pass | 3 |
| Totals | 9 | 9 | 7 | 10 | 9 | 8 | | 52 |
| 13 | 0 | 1 | 1 | 0 | 0 | 1 | Pass | 3 |
| 14 | 0 | 1 | 0 | 1 | 1 | 1 | Pass | 4 |
| 15 | 0 | 0 | 1 | 0 | 1 | 0 | Pass | 2 |
| 16 | 0 | 0 | 0 | 0 | 1 | 1 | Pass | 2 |
| 17 | 0 | 1 | 1 | 0 | 1 | 0 | Pass | 3 |
| 18 | 1 | 1 | 0 | 1 | 1 | 1 | Pass | 5 |
| Totals | 1 | 4 | 3 | 2 | 5 | 4 | | 19 |

Test IDs 1 to 6: Pb-bronze journal bearing+shaft with Ra=0.3 microns

Test IDs 7 to 12: Bi-bronze journal bearing+shaft with Ra<0.15 microns

Test IDs 13 to 18: Bi-bronze journal bearing+shaft with Ra<0.15 microns

As can be observed from the results in Table 9, the journal bearing/shaft pairs according to the present disclosure both performed significantly better than the prior art, commercially available journal bearings used with a shaft having an Ra of 0.3 microns.

Figure 8A:
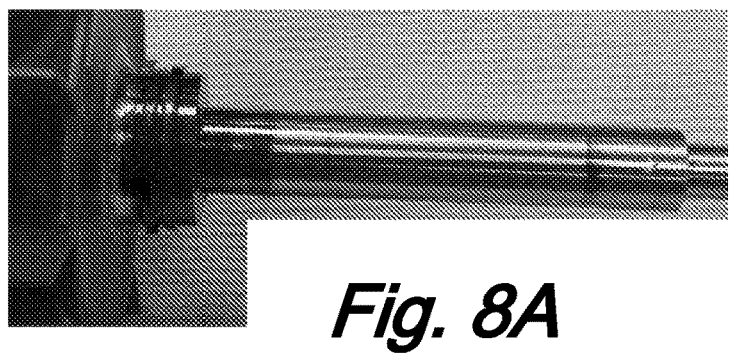
Figure 8B:
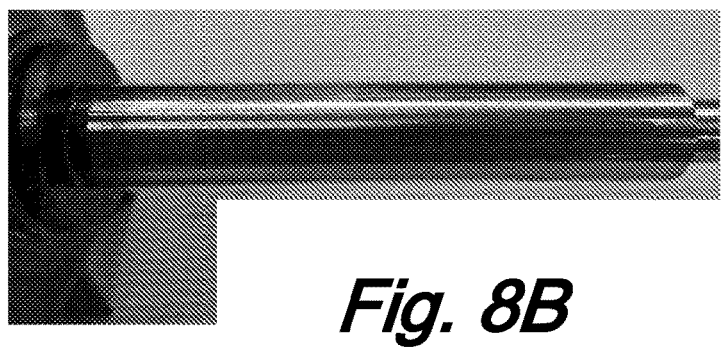
Figure 8C:
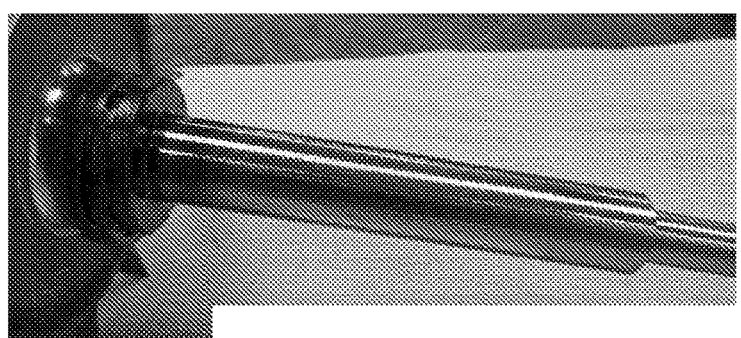

FIGS. 8A to 8C are photographs of turbocharger shafts after testing. FIG. 8A shows a shaft with an Ra of 0.3 microns after testing with a commercially available leaded-bronze journal bearing. FIGS. 8B and 8C show shafts with an Ra of less than 0.15 microns after testing with a bismuth-bronze journal bearing according to the present disclosure. As can clearly be seen from the photographs, the shaft and journal bearing pairings according to the present disclosure performed significantly better than the conventional shaft used with a leaded-bronze journal bearing.

The described and illustrated embodiments are to be considered as illustrative and not restrictive in character, it being understood that only the preferred embodiments have been shown and described and that all changes and modifications that come within the scope of the disclosures as defined in the claims are desired to be protected.

It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the disclosure as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A turbomachine comprising:
   a turbomachine shaft for rotation about an axis and for supporting a turbine wheel at one end of the turbomachine shaft; and
   a bearing housing defining a bore in which the turbomachine shaft is received with a substantially annular clearance, the turbomachine shaft being supported for rotation in the bore by at least one journal bearing located within the annular clearance;
   wherein a surface of the turbomachine shaft which radially underlies the at least one journal bearing has a surface roughness (Ra) of less than 0.15 microns and the at least one journal bearing comprises a bronze alloy incorporating bismuth in an amount of at least 1 wt % and up to 4 wt %.

2. A turbomachine according to claim 1, wherein the surface of the turbomachine shaft which radially underlies the at least one journal bearing has a surface roughness (Ra) of at least 0.02 microns.

3. A turbomachine according to claim 1, wherein the surface of the turbomachine shaft which radially underlies the at least one journal bearing has a surface roughness (Ra) of 0.06 to 0.08 microns.

4. A turbomachine according to claim 1, wherein the bronze alloy incorporates 2.0 to 3.9 wt % bismuth.

5. A turbomachine according to claim 1, wherein the bronze alloy incorporates 2.7 to 3.7 wt % bismuth.

6. A turbomachine according to claim 1, wherein the bronze alloy incorporates at least 80 wt % copper.

7. A turbomachine according to claim 1, wherein the bronze alloy incorporates 84 to 92 wt % copper.

8. A turbomachine according to claim 1, wherein the bronze alloy incorporates at least 5 wt % tin.

9. A turbomachine according to claim 1, wherein the bronze alloy incorporates 9 to 11 wt % tin.

10. A shaft and journal bearing assembly comprising:
   a shaft for rotation about an axis; and
   at least one journal bearing to be mounted on the shaft;
   wherein a surface of the shaft which will radially underlies the at least one journal bearing when mounted on the shaft has a surface roughness (Ra) of less than 0.15 microns and the at least one journal bearing comprises a bronze alloy incorporating bismuth in an amount of at least 1 wt % and up to 4%.

11. A shaft and journal bearing assembly according to claim 8, wherein the surface of the shaft which radially underlies the at least one journal bearing has a surface roughness (Ra) of at least 0.02 microns.

\* \* \* \* \*